United States Patent
Day et al.

(10) Patent No.: US 8,892,787 B2
(45) Date of Patent: Nov. 18, 2014

(54) METHODS AND APPARATUS FOR PACKING RECEIVED FRAMES IN BUFFERS IN A SERIAL ATTACHED SCSI (SAS) DEVICE

(75) Inventors: Brian A. Day, Colorado Springs, CO (US); Parameshwar Ananth Kadekodi, Colorado Springs, CO (US); Kabra Nitin Satishchandra, Undri (IN)

(73) Assignee: LSI Corporation, Milpitas, CA (US)

( * ) Notice: Subject to any disclaimer, the term of this patent is extended or adjusted under 35 U.S.C. 154(b) by 95 days.

(21) Appl. No.: 13/412,908

(22) Filed: Mar. 6, 2012

(65) Prior Publication Data
US 2013/0238821 A1     Sep. 12, 2013

(51) Int. Cl.
*G06F 13/28*     (2006.01)

(52) U.S. Cl.
USPC ............................................. 710/25; 710/26

(58) Field of Classification Search
USPC .......................................................... 710/25
See application file for complete search history.

(56) References Cited

U.S. PATENT DOCUMENTS

| | | | |
|---|---|---|---|
| 7,877,524 B1 * | 1/2011 | Annem et al. | 710/26 |
| 8,271,700 B1 * | 9/2012 | Annem et al. | 710/26 |
| 2009/0168525 A1 * | 7/2009 | Olbrich et al. | 365/185.11 |
| 2010/0106911 A1 * | 4/2010 | Day et al. | 711/119 |
| 2010/0312941 A1 * | 12/2010 | Aloni et al. | 710/310 |
| 2011/0131374 A1 * | 6/2011 | Noeldner et al. | 711/114 |
| 2011/0219150 A1 * | 9/2011 | Piccirillo et al. | 710/24 |
| 2011/0276725 A1 * | 11/2011 | Yun et al. | 710/15 |

\* cited by examiner

*Primary Examiner* — Henry Tsai
*Assistant Examiner* — John Roche
(74) *Attorney, Agent, or Firm* — Duft Bornsen & Fettig

(57) ABSTRACT

Methods and apparatus for packing received Serial Attached SCSI (SAS) frames in buffers for transmission to a host system memory. SAS frames are received from another SAS device and stored in a frame buffer memory. User data in the received frames has appended SCSI Data Integrity Fields (DIF information) to enhance reliability. Features and aspects hereof use the DIF information to validate the user data and then strip the DIF information to densely pack the validated user data in a DMA staging buffer for transmission to a host's system buffer memory using DMA features of the SAS device. The DMA circuit is programmed and started when the staging buffer is filled to at least a threshold amount of data to thereby improve efficacy of the DMA transfer performance. Other criteria may also be employed to determine when to start the DMA circuit.

20 Claims, 6 Drawing Sheets

METHODS AND APPARATUS FOR PACKING RECEIVED FRAMES IN BUFFERS IN A SERIAL ATTACHED SCSI (SAS) DEVICE

BACKGROUND

1. Field of the Invention

The invention relates generally to apparatus for receiving a serial data stream and more specifically relates to efficiently packing received frames of a Serial Attached SCSI (SAS) data stream into buffers for efficient transfers from a SAS device to a system memory.

2. Discussion of Related Art

In Serial Attached SCSI (SAS) communications systems, an initiator device (e.g., a storage controller or host system) opens a connection with an identified SAS target device (e.g., a storage device) for purposes of sending data to the target or receiving data from the target. Data is then exchanged over the open connection as frames.

For example, when a SAS target device sends data (i.e., requested read data) to a requesting SAS initiator device, the serial data passes up from the PHY layer (physical layer) of the initiator device to the link layer and so on until eventually, the received data is stored in a memory buffer of the system (i.e., system memory of the initiator device or the host system). This transfer to system buffer memory is typically performed by a direct memory access (DMA) component.

In using a DMA circuit to transfer data, it is common to design the device to set up and start the DMA circuit once some threshold volume of data is received. The overhead processing to set up and start the DMA transfer may be best amortized when the amount of data to transfer is at least as large as the designed threshold value. Otherwise, the device may incur excessive overhead processing by setting up and starting the DMA circuit too frequently for smaller transfers.

For example, in some SAS initiator designs, a DMA threshold may be defined such that the initiator device waits to receive two full frames of data before sending the data, via DMA, to the system memory (i.e., the initiator device's buffer memory). In SAS, a frame may be up to 1024 bytes in length. Thus, a DMA threshold value for such an exemplary initiator device may be 2×1024 or 2048 bytes of data.

SAS (and more generally SCSI) protocols allow for end to end data protection (EEDP) to help assure reliability. In EEDP, data protection information (a data integrity field or DIF) comprising 8 bytes can be inserted/removed/checked for each block of data sent/received from an initiator to a target. The data protection information can be stored/generated/removed/checked in the source/destination device in association with the block of data and is returned/removed with the associated data when the block of data is read back by the initiator device/written to the target device. The sending/receiving device includes a layer of processing that verifies the integrity of the received data (based on the sent/received DIF associated with each block received from the other device). If the blocks of data are properly verified the data (stripped of the DIF field) is then forwarded to the system memory buffer of the receiving device using DMA.

However, where EEDP is used, the DIF information may disrupt the order of the actual user data to be returned to the system buffer memory. Thus, the DMA circuit may be operating in less than an optimal mode due to the non-contiguous nature of the received data (i.e., the received user data with appended DIFs at each data block boundary).

Thus it is an ongoing challenge to efficiently transfer data from a SAS initiator to a system buffer memory using DMA circuits of the initiator device.

SUMMARY

The present invention solves the above and other problems, thereby advancing the state of the useful arts, by providing methods and apparatus for packing received SAS frames in buffers for transmission to a host system memory. SAS frames are received from another SAS device and stored in a frame buffer memory. User data in the received frames has appended SCSI Data Integrity Fields (DIF information) to enhance reliability. Features and aspects hereof use the DIF information to validate the user data and then strip the DIF information to densely pack the validated user data in a DMA staging buffer for transmission to a host's system buffer memory using DMA features of the SAS device. The DMA circuit is programmed and started when the staging buffer is filled to at least a threshold amount of data to thereby improve efficacy of the DMA transfer performance. Other criteria may also be employed to determine when to start the DMA circuit.

In one aspect hereof, an apparatus is provided in a SAS device operable to buffer data for transmission to a system buffer memory of an attached host device. The apparatus comprises a frame buffer memory adapted to store a frame as it is received from another SAS device wherein a received frame comprises one or more portions of one or more of: user data and data integrity field (DIF) information. The apparatus further comprises a direct memory access (DMA) staging buffer memory adapted to store user data derived from one or more received frames for transmission to a system buffer memory in a system coupled with the SAS device. The apparatus further comprises a DMA circuit coupled with the DMA staging buffer memory and adapted to controllably transfer user data from the DMA staging buffer memory to the system buffer memory. The apparatus further comprises an end to end data protection (EEDP) circuit coupled with the frame buffer memory and adapted to validate user data in a received frame using associated DIF information in a received frame. The apparatus further comprises control logic coupled with the EEDP circuit and with the DMA circuit and with the frame buffer memory and with the DMA staging buffer memory. The control logic is adapted to, responsive to the EEDP circuit validating user data in a received frame, copy one or more portions of user data from the frame buffer memory into the DMA staging buffer memory contiguous with other copied portions of user data. The control logic is further adapted to start the DMA circuit to send user data in the DMA staging buffer memory to the system memory responsive to sensing that the amount of user data in the DMA staging buffer memory exceeds a predetermined threshold value.

Another aspect hereof provides a method and a computer readable medium embodying the method. The method is operable in a SAS device to buffer user data to be sent to a system buffer memory of an attached host device. The method comprises receiving a plurality of frames from another SAS device where each frame comprises one or more portions of one or more of: user data and data integrity field (DIF) information. The method further comprises storing the plurality of frames in a frame buffer memory of the SAS device and determining whether user data in the frame buffer memory is valid using associated DIF information in the frame buffer memory. The method further comprises, responsive to determining that user data in the frame buffer memory is valid, copying valid user data from the frame buffer memory into a direct memory access (DMA) staging buffer memory. The method further comprises, responsive to sensing that the amount of valid user data in the DMA staging buffer memory exceeds a predetermined threshold value, starting a DMA circuit of the SAS device to send user data in the DMA staging buffer memory to a system buffer memory of another device.

DETAILED DESCRIPTION OF THE DRAWINGS

Figure 1:
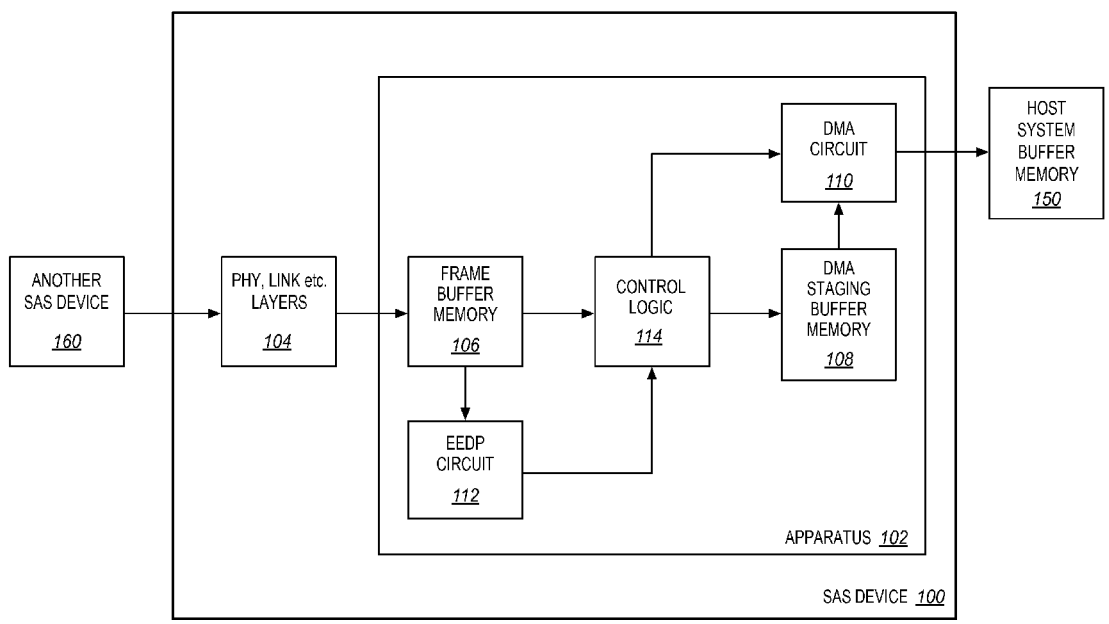
FIG. 1 is a block diagram of an exemplary SAS device enhanced in accordance with features and aspects hereof to pack user data extracted from received frame buffers into a DMA staging buffer without DIF information for transmission to a host's system memory.

FIG. 1 is a block diagram of an exemplary SAS device 100 enhanced in accordance with features and aspects hereof to improve the packing of user data to be communicated to an attached system buffer memory 150 using DMA circuit 110 of apparatus 102. Enhanced SAS device 100 is adapted to couple with another SAS device 160 and adapted to receive frames transmitted from device 160 through a SAS communication medium (e.g., a SAS fabric) coupling the two SAS devices. SAS device 160 may be, for example, a SAS target device or a SAS expander device. Enhanced SAS device 100 is typically a SAS initiator device such as is often embodied within a storage controller and/or host bus adapter (HBA) coupled with a host system. The SAS initiator device in such an exemplary embodiment often utilizes a DMA capability to transfer received user data directly into the system buffer memory 150 of the associated host system or component. As noted above, as presently practiced, such DMA capabilities may be less than optimally utilized when received frames incorporate EEDP data (i.e. DIF fields embedded in the data portion of a frame and associated with a user data block in the frame). These problems arise because the alignment of blocks of user data and frames may be shifted due to the presence of the DIF fields.

Enhanced SAS device 100 incorporates apparatus 102 to help resolve the problems of sub-optimal operation of DMA transfers of user data to system buffer memory 150. Apparatus 102 comprises a frame buffer memory 106 adapted to store received SAS frames received from another SAS device 160 via PHY and link layer processing elements 104. Elements 104 represent any suitable PHY control logic and link control logic as is present in any device complying with SAS standards. A received frame is stored in frame buffer memory 106 and accessed by EEDP circuit 112 of apparatus 102 to determine whether the user data received in a frame is valid based upon associated DIF information in this (or another) received frame. If EEDP circuit 112 validates the user data in the received frame stored in frame buffer memory 106, control logic 114 is operable to copy the validated user data stored in frame buffer memory 106 into DMA staging buffer memory 108 of apparatus 102. The user data so copied by control logic 114 is stripped of the associated DIF information so that multiple portions of user data copied from one or more received frames may be packed contiguously into DMA staging buffer memory 108 to thereby improve DMA operation efficacy.

DMA circuit 110 of apparatus 102 is operable to transfer densely packed user data from DMA staging buffer memory 108 into system buffer memory 150. Control logic 114 appropriately programs and starts DMA circuit 110 when control logic 114 senses that a sufficient threshold amount of user data has been packed into DMA staging buffer memory 108. The particular threshold amount of user data to be packed may be determined as a matter of design choice for any particular implementation of apparatus 102 and device 100. The desired threshold value may be determined as a function of a variety of factors including, for example, the transfer rate achievable by DMA circuit 110 when moving data from memory 108 into memory 150, the complexity and time required to program and initialized DMA circuit 110 to commence the transfer, and the transfer rate of frames received from another SAS device 160.

In general, control logic 114 comprises any suitable combinatorial or sequential logic operable to couple with EEDP circuit 112, DMA circuit 110, and with both frame buffer memory 106 and DMA staging buffer memory 108. Control logic 114 is further suitably designed to, responsive to EEDP circuit 112 validating user data in a received frame, copy one or more portions of user data from frame buffer memory 106 into DMA staging buffer memory 108 in a manner contiguous with other copied portions of user data. Control logic 114 is further adapted to program and start DMA circuit 110 to send user data in DMA staging buffer memory 108 to system memory 150 responsive to sensing that the amount of user data in DMA staging buffer memory 108 meets or exceeds a predetermined threshold value. As discussed in further detail herein below, control logic 114 may apply other/additional analysis for determining when to commence transfer of a tightly packed buffer of user data from memory 108 to memory 150 utilizing DMA circuit 110.

DMA circuit 110 may be implemented utilizing any of several well-known commercially available DMA control circuits or may be implemented as customized logic specifically designed to operate in conjunction with control logic 114. EEDP circuit 112 may be implemented utilizing any of several well-known commercially available circuits for generation and validation of data utilizing SCSI standard DIF fields. Frame buffer memory 106 and DMA staging buffer memory 108 may comprise any suitable RAM memory components for storing received frames and tightly packed user data, respectively. The particular size for each buffer memory may be selected as a matter of design choice based on desired performance characteristics of SAS device 100. For example, frame buffer memory 106 may be sized to permit additional frames to be received from other device 160 while control logic 114 processes earlier received frames to tightly pack validated user data into buffer 108. In like manner, DMA staging buffer memory 108 may be sized to permit other tightly packed buffers to be constructed while an earlier packed buffer is being transferred by DMA circuit 110 to memory 150.

Those of ordinary skill in the art will readily recognize numerous additional and equivalent components that may be present in a fully functional SAS device as exemplified in FIG. 1. Such additional and equivalent elements components are omitted here and for simplicity and brevity of this discussion. Further, those of ordinary skill in the art will recognize that the features of apparatus may be implemented as custom designed logic circuits, suitably programmed instructions executed by an appropriate general or special purpose processor, or combinations of such implementations. Still further, those of ordinary skill in the art will recognize that the features of apparatus 102 may be implemented as one or more custom logic circuits to provide the various functions as integrated within one custom circuit or to be partitioned among a plurality of circuits. Still further, the features of apparatus 102 may be separated from other programs or logic of device 100 or may be integrated with other features and functions of device 100 such as PHY and link layer control elements 104. Such design choices are well known to those of ordinary skill in the art.

Figure 2:
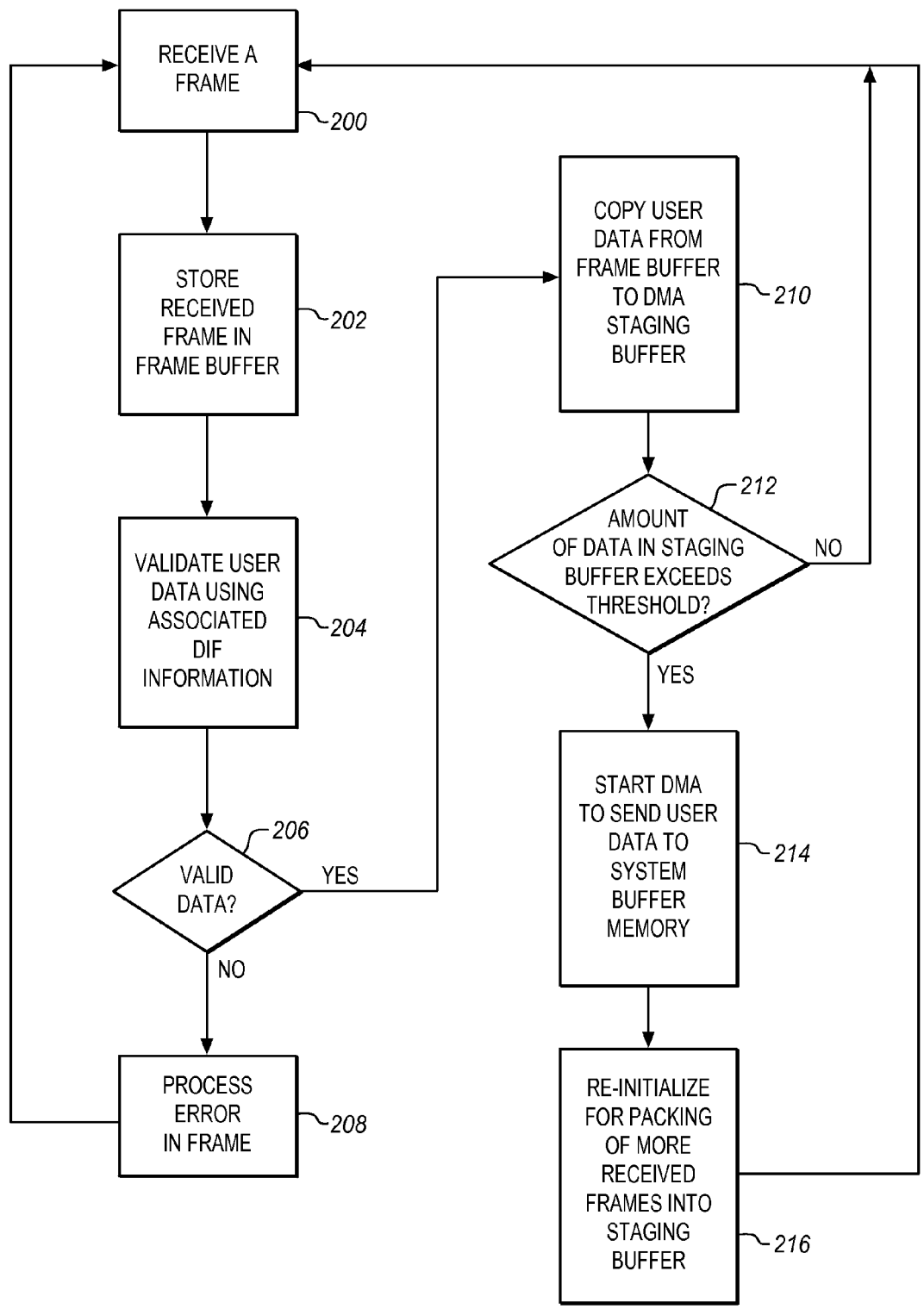
FIG. 2 is a flowchart describing an exemplary method in accordance with features and aspects hereof to densely pack user data extracted from received SAS frames into a DMA staging buffer without associated DIF information for DMA transfer to a host's system memory.

FIG. 2 is a flowchart describing an exemplary method of operating an enhanced SAS device. The method of FIG. 2 may be operable, for example, in an enhanced SAS device such as device 100 of FIG. 1. More specifically, the method of FIG. 2 may be operable in the enhanced apparatus 102 of device 100 of FIG. 1. At step 200, a frame is received from another SAS device. Standard SAS PHY and link layer protocol management features of the enhanced SAS device (e.g., element 104 of FIG. 1) may receive the frame and signal the processing of the method of FIG. 2 to proceed responsive to receipt a new frame. At step 202, the received frame is stored in a frame buffer. As noted above, as a matter of design choice, one or more frame buffers may be implemented to allow processing of a first received frame in a frame buffer to proceed while another frame buffer is ready to receive the next frame from the other SAS device. Step 204 represents processing by an EEDP logic component to validate user data located in the received frame as stored in the frame buffer. Where user data is associated with DIF fields in accordance with SCSI standard, processing of step 204 identifies user data and its associated DIF information and applies the DIF information to validate that the received user data stored in the frame buffer is valid user data. At step 206, control logic of the enhanced SAS device responds to the EEDP analysis of the user data to determine whether the user data in the frame buffer is valid or not valid. If the stored user data is determined to be not valid, step 208 takes appropriate action to process the error in the received frame. Details of such error processing are beyond this discussion but are generally well known to those of ordinary skill in the art.

If the user data stored in the frame buffer is determined to be valid user data, control logic of the enhanced SAS device is operable at step 210 to copy the validated user data from the frame buffer to a DMA staging buffer in preparation for transmission to a system buffer memory. As discussed in further detail herein below, the validated user data copied from the frame buffer to the DMA staging buffer is densely packed in the staging buffer by eliminating the DIF fields from the data to be copied into the staging buffer. Thus the DMA staging buffer is densely packed with only valid user data. At step 212, control logic of the enhanced SAS device determines whether the amount of data in the staging buffer exceeds a predetermined threshold amount. If not, processing continues looping back to step 200 awaiting receipt of a next frame from the other SAS device. If step 212 determines that the amount of data in the staging buffer has exceeded the threshold amount, control logic at step 214 programs and starts the DMA circuit of the SAS device to send the valid user data from the densely packed staging buffer to the system buffer memory of an associated host device. Step 216 and then re-initializes to prepare for packing of more valid user data from received frames into a DMA staging buffer. As noted above, multiple frame buffers and/or multiple DMA staging buffers may be utilized to allow for processing of one frame of packed buffer while other buffers are being utilized.

Figure 3:
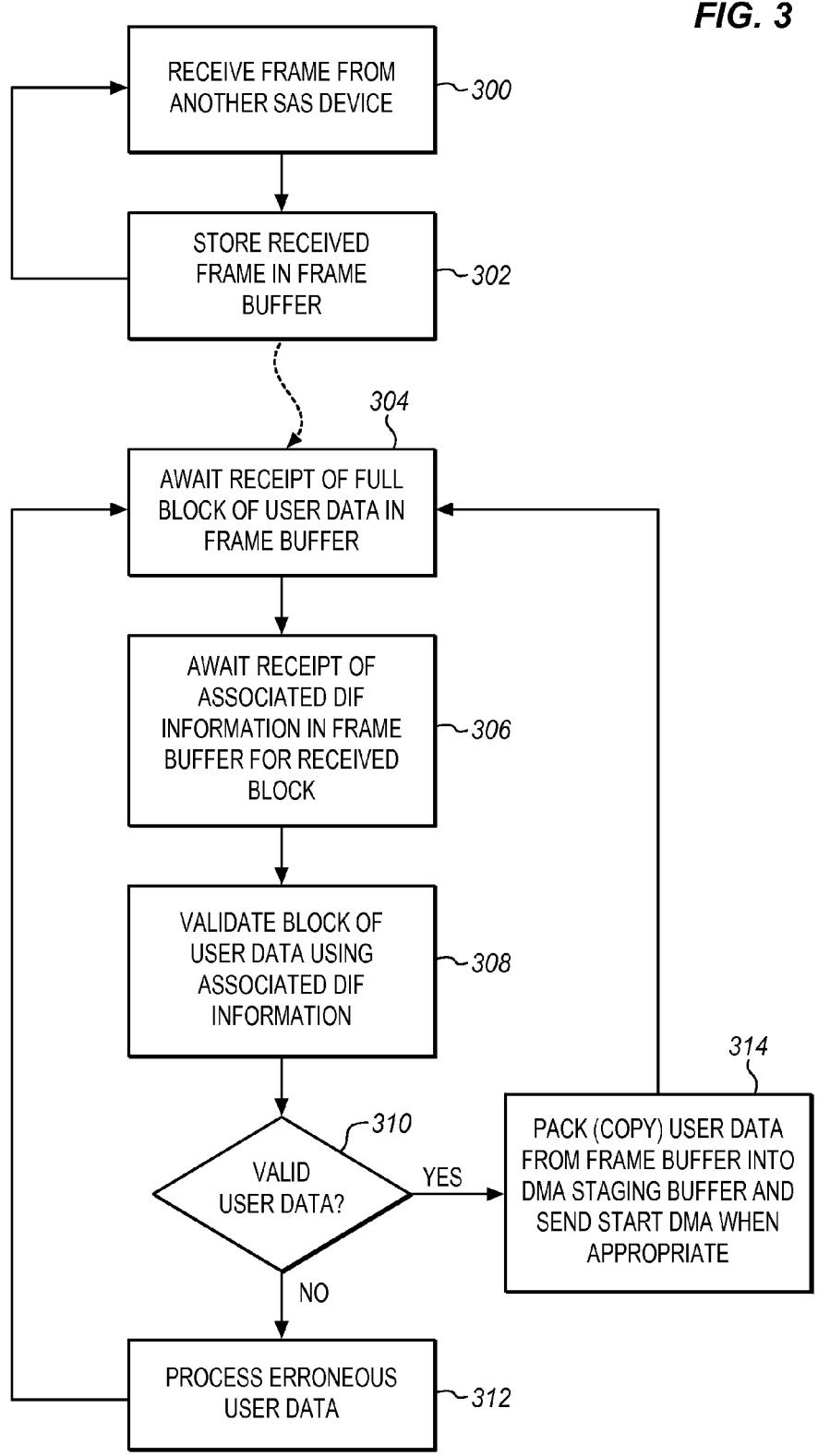
FIG. 3 is a flowchart describing another exemplary method in accordance with features and aspects hereof to densely pack user data extracted from received SAS frames into a DMA staging buffer without associated DIF information for DMA transfer to a host's system memory.

FIG. 3 is a flowchart describing another exemplary method in accordance with features and aspects hereof to improve efficiency of DMA transfers from a SAS device to an associated system buffer memory. As above with respect to FIG. 2, the method of FIG. 3 is operable in, for example, an enhanced SAS device such as device 100 of FIG. 1 and more specifically in enhanced apparatus 102 of device 100 of FIG. 1. Steps 300 and 302 represent standard processing within the SAS device to receive a frame from another SAS device at step 300 and to store the received frame in a suitable frame buffer at step 302. As noted above, multiple such frame buffers may be employed to "double buffer" the receipt of frames such that a next frame may be received while a previously received frame is being processed within the frame buffer memory in which it is stored.

Step 300 and 302 are iteratively operable to continue receiving and storing frame buffers from the other SAS device. In addition, each time a received frame is stored in a frame buffer, step 302 signals processing of steps 304 through 314 (as indicated by the dashed arrow) to commence processing of a recently received frame. In particular, step 304 awaits receipt of a full block of user data in the currently received frame buffer. As noted above, due to the presence of DIF fields and/or other reasons, user data blocks may not be completely aligned with boundaries of received frames of data. In other words, a block of user data may be split across two or more frames. Thus, step 304 waits until a complete block of user data has been received in the present frame buffer or is received as a combination of remaining data in a previous frame buffer associated with new data in a newly received frame buffer.

Once a full block of user data has been identified in a received frame buffer (or split over multiple frames), control logic at step 306 similarly awaits receipt of the associated DIF information in the present or a next received frame buffer. As noted above, since the boundaries of frames and user data blocks may differ in particular due to the presence of EEDP DIF fields, the DIF information associated with a received block of user data may also be resident in a next received frame.

Once a complete user data block and its associated DIF information have been received, EEDP related logic at step 308 applies the DIF information to the received user data block to validate the user data. Control logic at step 310 then determines whether the EEDP computations validated the user block or detected an invalid user data block. If the EEDP logic determined that the user data is invalid, step 312 performs appropriate processing for the erroneous user data. Specific details of such error processing are beyond the scope of this discussion but are generally well known to those of ordinary skill in the art. If the EEDP logic determined that a user data block is valid, step 314 is next operable (within the control logic) to extract or copy the validated user data from frame buffer memory into a DMA staging buffer. As noted above, the user data is packed in the sense that each new block of user data is contiguously stored following previously validated, stored user data blocks. In general, the start address for each block to be stored is based on the starting address of the DMA staging buffer offset by the length of any previously received and packed user data blocks. Any suitable register and/or pointer structure may be utilized to maintain such information to indicate a next location for storing of a validated user data block. Further, at step 314, control logic of the enhanced SAS device determines whether the amount of data now stored in the DMA staging buffer is at or above a predetermined threshold value. If the data in the DMA staging buffer meets or exceeds a predetermined threshold, control logic at step 314 also programs and starts the DMA circuit operation to transfer the packed user data in the DMA staging buffer to a system memory buffer of an associated host device. As noted above, double buffering or other techniques may be utilized in the DMA staging buffer memory so that another packed DMA staging buffer may be generated while a previously generated buffer is being transmitted by operation of the DMA logic. Processing continues looping back to step 304 to await receipt of another full block of user data in the frame buffer memory.

Processing of steps 300 and 302 continue iteratively to receive and store new frames from another SAS device while steps 304 through 314 are iteratively operable substantially in parallel to pack user data from the received frame into a DMA staging buffer for transmission to the host's system memory buffer.

Figure 4:
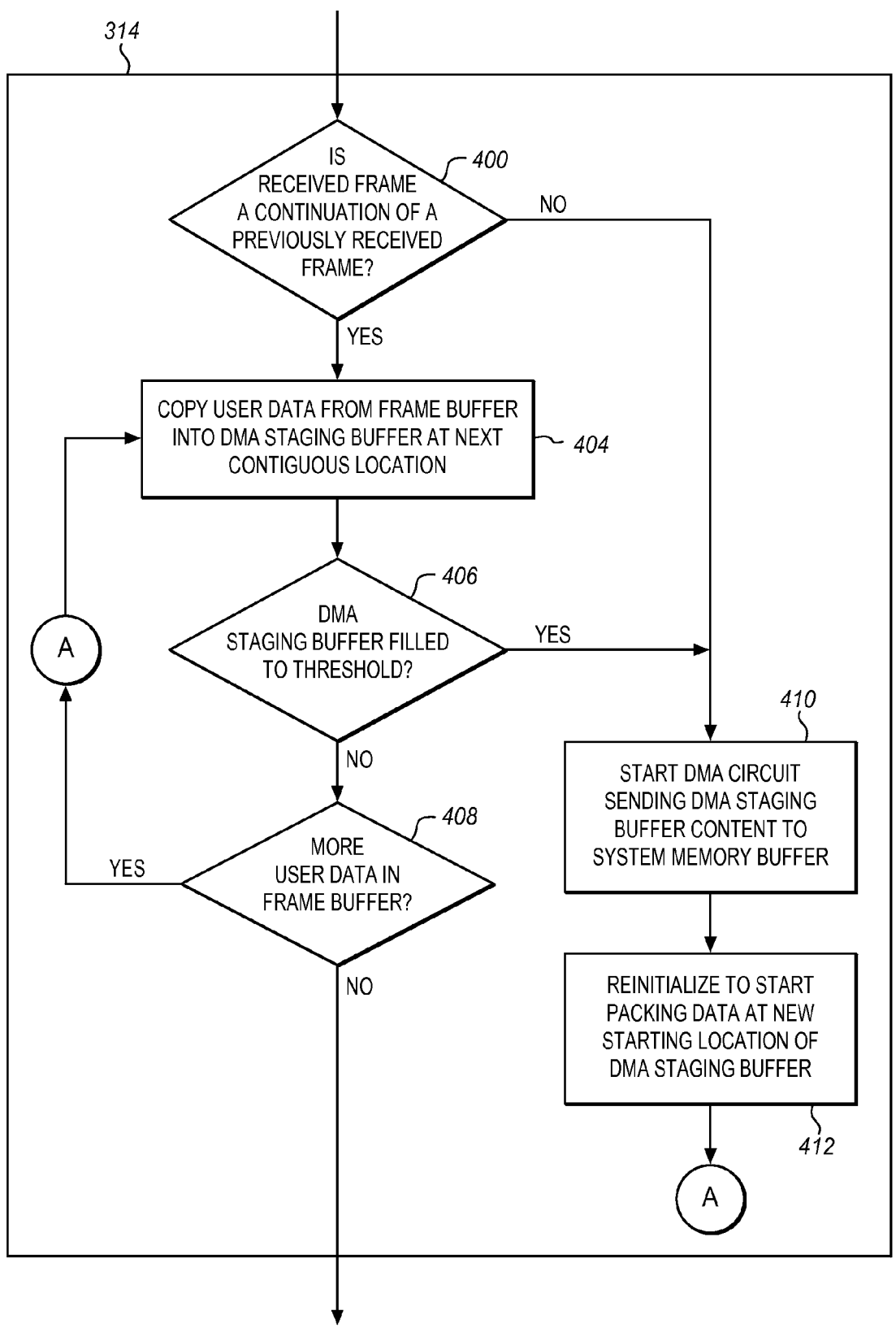
FIGS. 4 and 5 are flowcharts providing exemplary additional details of the processing of steps of the method of FIG. 3.

FIG. 4 is a flowchart describing exemplary additional details of the processing of step 314 of FIG. 3 as discussed above. In general, step 314 is operable to pack blocks of user data located within frames received from another device into a DMA staging buffer and to program and start the DMA circuit transmitting the DMA staging buffer when appropriate conditions arise. At step 400, a determination is made as to whether the received frame is a continuation of a previously received frame. In the SAS protocols, each frame may be flagged as related to (i.e., a continuation of) a previously (e.g., preceding) received frame such that a sequence of related frames may be transmitted and identified as such by the receiving SAS device. If step 400 determines that the newly received frame is not a continuation of a preceding received frame, step 404 programs and starts the DMA circuit of the enhanced SAS device to send the contents of the DMA staging buffer to the host system memory buffer. Step 412 then re-initializes as required to start packing more user data at a new starting location of a DMA staging buffer (e.g., into a second DMA staging buffer or into a subsequent location of a single DMA staging buffer. Processing then continues at step 404 as indicated by label "A".

If step 400 determined that the newly received frame is a continuation of a previously received frame, step 404 (label "A") copies the validated user data from the frame buffer memory into an appropriate location of the DMA staging buffer memory. As noted above, user data is densely packed in the DMA staging buffer such that the newly received validated user data is copied at a next contiguous location following previously stored validated user data. Thus, user data is extracted and packed into the DMA staging buffer devoid of the EEDP DIF fields and other frame related overhead. Step 406 then determines whether the amount of data presently packed in the DMA staging buffer meets or exceeds a predetermined threshold amount. If so, processing continues at step 410 as discussed above to commence operation of the DMA circuit and to reinitialize to start packing more user data in an appropriate location of the DMA staging buffer memory. If the DMA staging buffer is not yet filled to the threshold capacity, step 408 next determines whether more user data is present in the frame buffer to be processed. If so, processing continues looping back to step 404 to iteratively locate and copy more user data from the frame buffer into the densely packed DMA staging buffer. If no further user data is present in the currently received frame buffer, processing of step 314 is completed.

Figure 5:
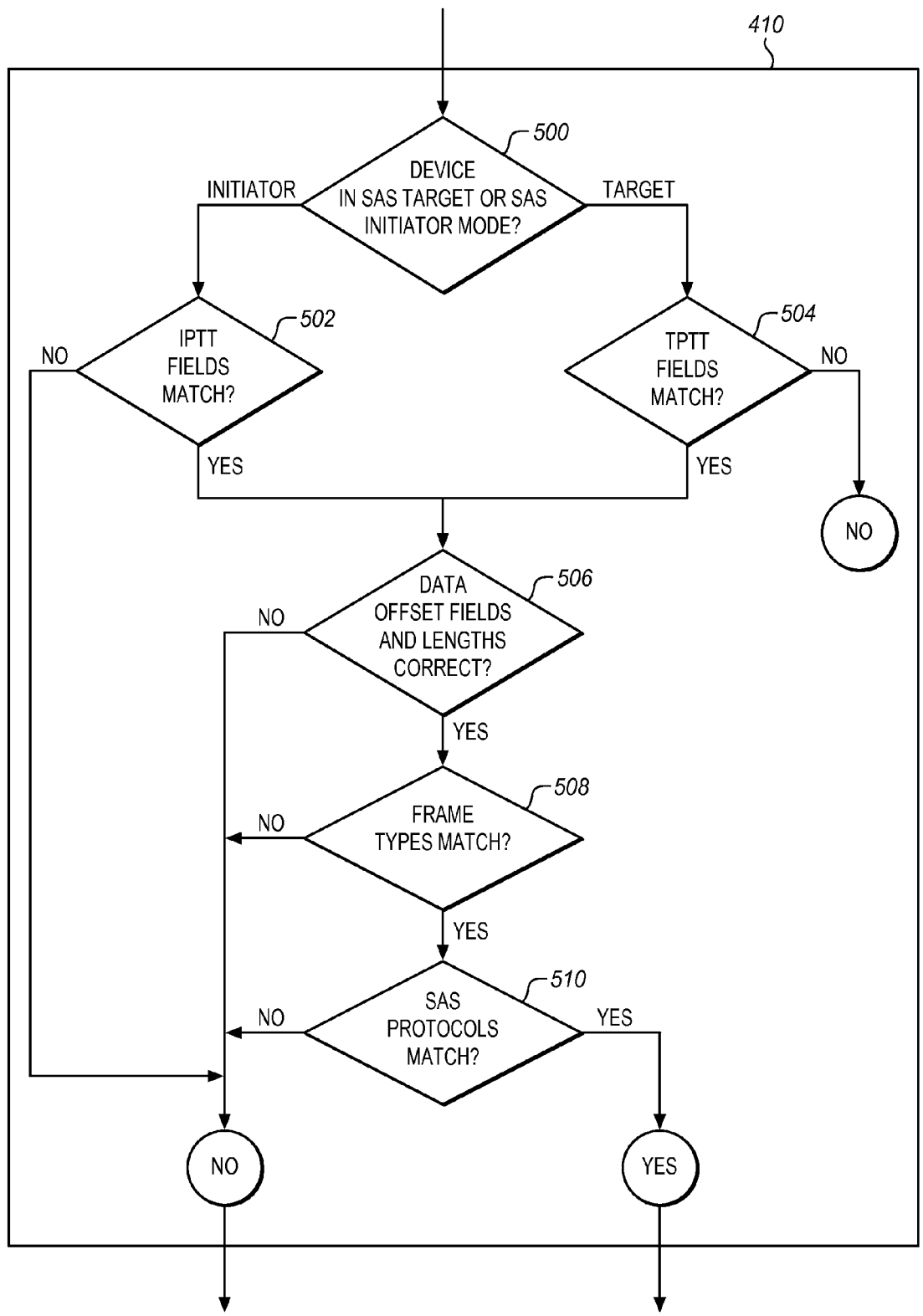

FIG. 5 is a flowchart describing exemplary additional details of the processing of step 410 of FIG. 4. Step 410 of FIG. 4 is generally operable to determine whether a frame received from another device is a continuation of a previously (preceding) received frame. In accordance with SAS protocols, a number of parameters may be checked in an overhead header portion of each received frame to determine whether the presently received frame is a continuation of a preceding received frame. At step 500, control logic of the enhanced SAS device determines whether the device is presently operating in a SAS target mode or a SAS initiator mode. If operating in an initiator mode, step 502 next determines whether the initiator port transfer tag fields (IPTT in the frame header) of the received frame are equal to that of the preceding received frame. If so, processing continues at step 506 to continue testing as discussed below. Otherwise, the presently received frame is not a continuation of a preceding received frame and processing of step 410 is completed (with a "No" response). If operating in a target SAS mode, step 504 next determines whether the target port transfer tag fields (TPTT in the frame header) of the received frame and the preceding received frame are equal. If not, the received frame is not a continuation of a preceding frame and step 410 is complete (with a "No" response). Otherwise, processing continues testing at step 506.

Step 506 determines whether the data offset fields in the received frame and the preceding received frame and the length of user data in the preceding received frame are correct for a continuation frame. In other words, if the present received frame is a continuation of the a preceding received frame, then the data offset value in the preceding received frame (in its frame header) plus the length of user data in the preceding received frame (in its frame header) should be equal to the data offset value in the presently received frame (in its frame header). If the various offset and length fields match as expected for a continuation frame, testing continues at step 508. Otherwise the presently received frame is not a continuation of a preceding received frame and step 410 completes (with a "No" response). At step 508 the type field in the frame headers of both the presently received frame and the preceding received frame are compared to detect a match. If the types match, testing continues testing at step 510. Otherwise, the presently received frame and the preceding received frame are not related as continuations and step 410 completes (with a "No" response). At step 510, the SAS protocol identifier fields in the presently received frame and the preceding received frame are compared for a match. If the SAS protocols of the two frames match, then the present received frame is a continuation of the preceding received frame and step 410 completes (with a "Yes" response). Otherwise, the present frame is not a continuation of the preceding frame and step 410 completes (with a "No" response).

Those of ordinary skill in the art will readily recognize numerous additional and equivalent steps in fully operational methods such as the methods described above with respect to FIGS. 2 through 5. Such additional and equivalent steps are omitted for simplicity and brevity of this discussion.

Figure 6:
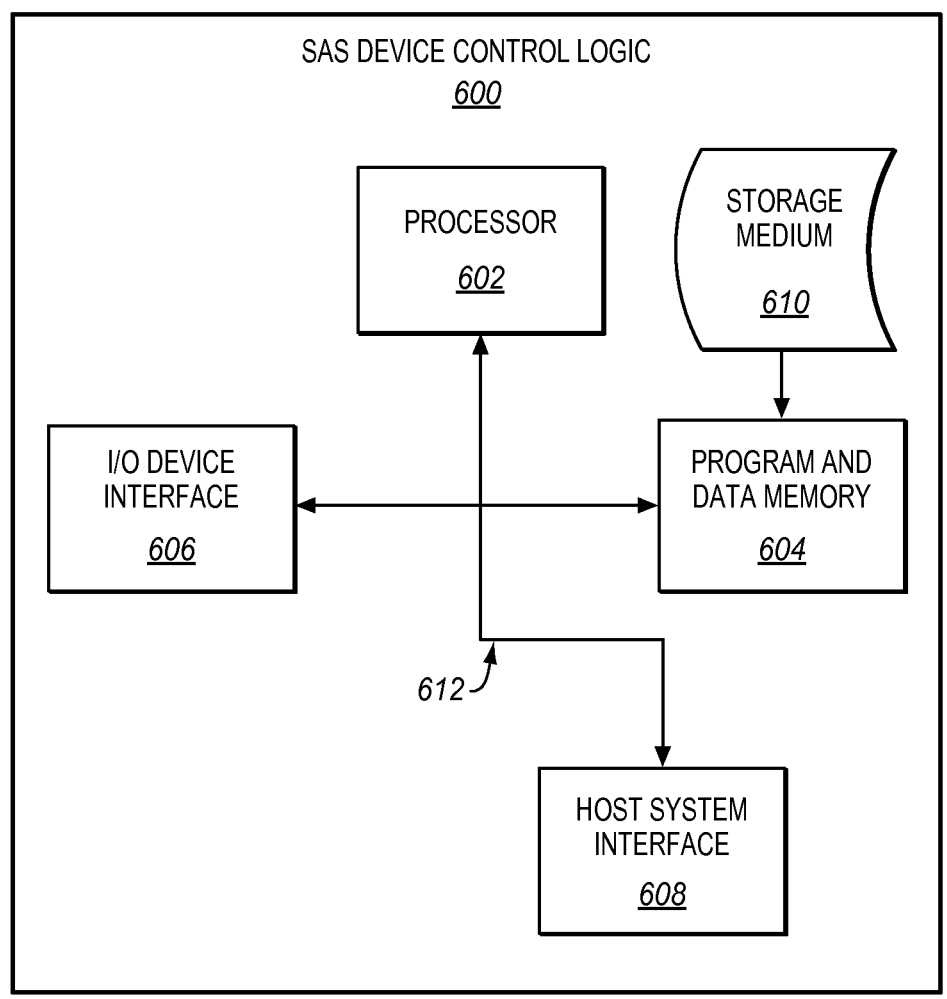
FIG. 6 is a block diagram of an exemplary apparatus of an enhanced SAS device such as in FIG. 1 in which a computer readable medium may provide programmed instructions for implementing methods in accordance with features and aspects hereof.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc. FIG. 6 is a block diagram depicting a SAS device control logic 600 adapted to provide features and aspects hereof by executing programmed instructions and accessing data stored on a computer readable storage medium 610. Logic 600 may be a computer such as embedded within the SAS device that densely packs user data from received frames into DMA staging buffers.

Furthermore, embodiments of the invention can take the form of a computer program product accessible from a computer-usable or computer-readable medium 610 providing program code for use by, or in connection with, a computer or any instruction execution system. For the purposes of this description, a computer-usable or computer readable medium can be any non-transitory apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Logic 600 suitable for storing and/or executing program code will include at least one processor 602 coupled directly or indirectly to memory elements 604 through a system bus 612. The memory elements 604 can include local memory employed during actual execution of the program code, bulk storage, and cache memories that provide temporary storage of at least some program code in order to reduce the number of times code must be retrieved from bulk storage during execution.

Input/output interface 606 couples the logic to I/O devices (e.g., other SAS devices, etc.). Host system interface 608 may also couple logic 600 to other data processing systems.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. An apparatus in a Serial Attached SCSI (SAS) device configured to buffer data for transmission to a system buffer memory of an attached host device, the apparatus comprising:
    a frame buffer memory adapted to store frames as they are received from another SAS device wherein received frames each comprise one or more of: user data and data integrity field (DIF) information for validating user data;
    a direct memory access (DMA) staging buffer memory adapted to store user data derived from received frames for transmission to a system buffer memory in a system coupled with the SAS device;
    a DMA circuit coupled with the DMA staging buffer memory and adapted to controllably transfer user data from the DMA staging buffer memory to the system buffer memory;
    an end to end data protection (EEDP) circuit coupled with the frame buffer memory and adapted to validate user data in a received frame using associated DIF information in a received frame; and
    control logic coupled with the EEDP circuit and with the DMA circuit and with the frame buffer memory and with the DMA staging buffer memory, the control logic adapted to, responsive to the EEDP circuit validating user data in a received frame, eliminate DIF information associated with the valid user data, and copy the valid user data from the frame buffer memory into the DMA staging buffer memory contiguous with other valid user data, such that the DMA staging buffer includes valid user data without including DIF information,
    the control logic further adapted to start the DMA circuit to send valid user data in the DMA staging buffer memory to the system buffer memory responsive to sensing that the amount of valid user data in the DMA staging buffer memory exceeds a predetermined threshold value.

2. The apparatus of claim 1
    wherein the control logic is further adapted to determine whether a received frame is a continuation of a preceding received frame, and
    wherein the control logic is further adapted to start the DMA circuit to send valid user data in the DMA staging buffer memory to the system memory responsive to determining that the received frame is not a continuation of the preceding received frame.

3. The apparatus of claim 2 wherein each received frame further comprises frame overhead information and wherein the control logic is further adapted to determine whether a received frame is a continuation of a preceding received frame based on frame overhead information of the received frame and frame overhead information of the preceding received frame.

4. The apparatus of claim 3
    wherein the control logic is further adapted to determine that the received frame is a continuation of the preceding received frame by determining from the frame overhead information of the received frame and the frame overhead information of the preceding received frame that:
    a type field of the received frame equals a type field of the preceding received frame, and that
    a data offset field of the received frame equals the sum of a data offset field of the preceding received frame and a number of user data bytes field in the preceding received frame, and that
    a transfer tag field of the received frame equals a transfer tag field of the preceding received frame, and that
    a SAS protocol field of the received frame equals a SAS protocol field of the preceding received frame.

5. The apparatus of claim 4
    wherein the control logic is further adapted to determine that the transfer tag field of the received frame equals the transfer tag field of the preceding received frame by determining that the initiator port transfer tag (IPTT) of the received frame equals the IPTT of the preceding received frame when the SAS device is operating in an initiator mode, or determining that the target port transfer tag (TPTT) of the received frame equals the TPTT of the preceding received frame when the SAS device is operating in a target mode.

6. A method for operating a Serial Attached SCSI (SAS) device to buffer user data to be sent to a system buffer memory of an attached host device, the method comprising:

receiving a plurality of frames from another SAS device, each frame comprising one or more of: user data and data integrity field (DIF) information for validating user data;

storing the plurality of frames in a frame buffer memory of the SAS device;

determining whether user data in the frame buffer memory is valid using associated DIF information in the frame buffer memory;

responsive to determining that user data in the frame buffer memory is valid, eliminating the DIF information associated with the valid user data, copying the valid user data from the frame buffer memory into a direct memory access (DMA) staging buffer memory, wherein the valid user data is contiguous with other valid user data, such that the DMA staging buffer includes valid user data without including DIF information;

responsive to sensing that the amount of valid user data in the DMA staging buffer memory exceeds a predetermined threshold value, starting a DMA circuit of the SAS device to send valid user data in the DMA staging buffer memory to a system buffer memory of another device.

7. The method of claim 6 further comprising:

determining whether a received frame is a continuation of a preceding received frame, and starting the DMA circuit to send valid user data in the DMA staging buffer memory to the system memory responsive to determining that the received frame is not a continuation of the preceding received frame.

8. The method of claim 7 wherein each received frame further comprises frame overhead information, wherein the step of determining whether a received frame is a continuation of a preceding received frame further comprises determining whether the received frame is a continuation based on frame overhead information of the received frame and frame overhead information of the preceding received frame.

9. The method of claim 8 wherein the step of determining that the received frame is a continuation of the preceding received frame further comprises determining that the received frame is a continuation by determining from the frame overhead information of the received frame and the frame overhead information of the preceding received frame that:

a type field of the received frame equals a type field of the preceding received frame, and that a data offset field of the received frame equals the sum of a data offset field of the preceding received frame and a number of user data bytes field in the preceding received frame, and that a transfer tag field of the received frame equals a transfer tag field of the preceding received frame, and that a SAS protocol field of the received frame equals a SAS protocol field of the preceding received frame.

10. The method of claim 9 wherein the step of determining that a transfer tag field of the received frame equals that of the preceding received frame further comprises determining that the initiator port transfer tag (IPTT) of the received frame equals the IPTT of the preceding received frame when the SAS device is operating in an initiator mode, or determining that the target port transfer tag (TPTT) of the received frame equals the TPTT of the preceding received frame when the SAS device is operating in a target mode.

11. A non-transitory computer readable medium tangibly storing programmed instructions that when executed by a computer perform a method in a Serial Attached SCSI (SAS) device, wherein the method buffers user data to be sent to a system buffer memory of an attached host device, the method comprising:

receiving a plurality of frames from another SAS device, each frame comprising one or more of: user data and data integrity field (DIF) information for validating user data;

storing the plurality of frames in a frame buffer memory of the SAS device;

determining whether user data in the frame buffer memory is valid using associated DIF information in the frame buffer memory;

responsive to determining that user data in the frame buffer memory is valid, eliminating the DIF information associated with the valid user data, copying the valid user data from the frame buffer memory into a direct memory access (DMA) staging buffer memory, wherein the valid user data is contiguous with other valid user data, such that the DMA staging buffer includes valid user data without including DIF information;

responsive to sensing that the amount of valid user data in the DMA staging buffer memory exceeds a predetermined threshold value, starting a DMA circuit of the SAS device to send valid user data in the DMA staging buffer memory to a system buffer memory of another device.

12. The medium of claim 11 the method further comprising:

determining whether a received frame is a continuation of a preceding received frame, and starting the DMA circuit to send valid user data in the DMA staging buffer memory to the system memory responsive to determining that the received frame is not a continuation of the preceding received frame.

13. The medium of claim 12 wherein each received frame further comprises frame overhead information, wherein the method step of determining whether a received frame is a continuation of a preceding received frame further comprises determining whether the received frame is a continuation based on frame overhead information of the received frame and frame overhead information of the preceding received frame.

14. The medium of claim 13 wherein the method step of determining that the received frame is a continuation of the preceding received frame further comprises determining that the received frame is a continuation by determining from the frame overhead information of the received frame and the frame overhead information of the preceding received frame that:

a type field of the received frame equals a type field of the preceding received frame, and that a data offset field of the received frame equals the sum of a data offset field of the preceding received frame and a number of user data bytes field in the preceding received frame, and that a transfer tag field of the received frame equals a transfer tag field of the preceding received frame, and that a SAS protocol field of the received frame equals a SAS protocol field of the preceding received frame.

15. The medium of claim 14 wherein the method step of determining that a transfer tag field of the received frame equals that of the preceding received frame further comprises determining that the initiator port transfer tag (IPTT) of the received frame equals the IPTT of the preceding received frame when the SAS device is operating in an initiator mode, or determining that the target port transfer tag (TPTT) of the received frame equals the TPTT of the preceding received frame when the SAS device is operating in a target mode.

16. The system of claim 1, wherein:
the DMA staging buffer memory stores only valid user data.

17. The method of claim 6, wherein:
the DMA staging buffer memory stores only valid user data.

18. The medium of claim 11, wherein:
the DMA staging buffer memory stores only valid user data.

19. The system of claim 1, wherein:
the control logic is further operable to eliminate the DIF information associated with the valid user data by:
removing the DIF information associated with the valid user data from the frame buffer.

20. The method of claim 6, wherein:
eliminating the DIF information associated with the valid user data comprises:
removing the DIF information associated with the valid user data from the frame buffer.

\* \* \* \* \*